United States Patent [19]
Wright

[11] 3,791,169
[45] Feb. 12, 1974

[54] TORSIONALLY RESILIENT SHAFT COUPLING

[75] Inventor: John Wright, Baltimore, Md.

[73] Assignee: Koppers Company, Pittsburgh, Pa.

[22] Filed: June 30, 1972

[21] Appl. No.: 268,049

Related U.S. Application Data

[63] Continuation-in-part of Ser. No. 123,666, March 12, 1971, Pat. No. 3,673,813.

[52] U.S. Cl.................... 64/1 V, 64/15 B, 64/27 B, 64/23
[51] Int. Cl................................................ F16d 3/00
[58] Field of Search....... 64/27 B, 27 C, 27 L, 15 B, 64/1 R, 1 V, 15 R, 26, 27 NM, 23 R

[56] References Cited
UNITED STATES PATENTS

| 785,323 | 3/1905 | Nadrowski | 64/15 B |
|---|---|---|---|
| 3,077,090 | 2/1963 | Haushalter | 64/27 NM |
| 3,280,949 | 10/1966 | Ross | 64/27 NM |
| 1,464,220 | 8/1923 | Sachs et al. | 64/26 |
| 3,233,428 | 2/1966 | Chalpin | 64/15 R |
| 2,823,527 | 2/1958 | Belden et al. | 64/23 |
| 3,036,445 | 5/1962 | Hein | 64/27 NM |

FOREIGN PATENTS OR APPLICATIONS

| 302,661 | 10/1954 | Switzerland | 64/1 V |
|---|---|---|---|
| 700,578 | 10/1940 | Germany | 64/15 B |

Primary Examiner—Benjamin W. Wyche
Assistant Examiner—Randall Heald
Attorney, Agent, or Firm—Boyce C. Dent; Olin E. Williams; Oscar B. Brumback

[57] ABSTRACT

A coupling for connecting a pair of coaxially aligned shafts for torsionally resilient driving rotation, comprising a first tubular member surrounding a portion of at least one of the shafts and having an end adapted for connection to the shaft; second tubular member surrounding the first tubular member and having an end adapted for connection to the other shaft; and the remaining ends of both tubular members being joined to one another for forming a torsionally resilient connection between the shafts.

12 Claims, 6 Drawing Figures

TORSIONALLY RESILIENT SHAFT COUPLING

CROSS REFERENCE TO RELATED APPLICATIONS

This application is a continuation-in-part of application Ser. No. 123,666 filed on Mar. 12, 1971 now U.S. Pat. No. 3,673,813.

BACKGROUND OF THE INVENTION

1. Field of the Invention

This invention relates generally to resilient shaft couplings and more particularly to those having yielding elements.

2. Description of the Prior Art

Generally, resilient couplings are used to transmit torque from a driving shaft to a driven shaft. In addition, resilient couplings are generally required to provide torsional flexibility and, in some cases, small amounts of offset and angular misalignment between driving and driven members although the driving and driven shafts themselves provide some torsional flexibility in drive systems.

An example of a practical application for torsionally resilient shaft couplings includes the drive train for rolls used in rolling mills for reducing the thickness of metal strips. In such rolling mill drive trains, high impact or shock loads are encountered and shaft couplings provide most of the needed torsional flexibility.

The drive train of rolling mills generally comprises electric motors coupled to reduction gears which are coupled through a shaft/coupling combination comprising two gear couplings connected by a shaft to a pinion stand. The pinion stand has two output shafts which drive the rolls to reduce the strip thickness. In some cases the reduction gears are omitted and the shaft of the shaft/coupling combination between the motors and the pinion stand is elongated because the motors and pinion stand are housed within separate rooms; therefore, the shaft must pass through a dividing wall in order to connect the motors and the pinion stand.

The drive system's dynamic characteristics are frequently such that an increase in torsional flexibility, or, stated another way, a reduction in torsional stiffness of the above mentioned connecting shaft, is desired in order to lower the system's torsional natural frequency or frequencies to reduce system response to torsional excitation caused by strip entry into the rolls.

The use of a conventional torsionally resilient coupling in such drive systems is frequently impractical because the magnitude of torque would require a massive and expensive coupling. An example of a frequently used torsionally resilient coupling is illustrated in Croset U.S. Pat. No. 2,621,493.

Similarly, in main propulsion drives of large ships there is an increasing tendency to mount the propulsion prime mover farther aft than has been done previously. This reduces the length available for the drive system and therefore reduces the torsional flexibility of the tail shafting. It is often desirable to increase the torsional flexibility of the reduced length shafting in order to attenuate torsional vibration. In this case also, due to the magnitude of the torque involved, a conventional torsionally resilient coupling would be massive and expensive.

A further application for torsionally resilient shaft couplings includes turbine powered drive systems such as those associated with centrifugal compressors where similar shaft/coupling combinations are employed to provide axial, (i.e., along the shaft axis) offset, (i.e., normal to the shaft axis) and angular (i.e., at some angle to the shaft axis) misalignment capabilities.

SUMMARY OF THE INVENTION

Accordingly, an object of the present invention is to provide a torsionally resilient shaft coupling that will overcome the aforementioned disadvantages and others. Thus, this invention provides a torsionally resilient shaft coupling for a drive system which is capable of providing substantially higher torsional resiliency than presently used couplings and which can accommodate some offset and angular misalignment between the driving and driven shafts.

This is generally accomplished by providing a first tubular member which surrounds a portion of at least one of a pair of coaxially aligned shafts and having an end adapted for connection to one of the shafts and a second tubular member which surrounds the first tubular member and having an end adapted for connection to the other shaft. The remaining ends of each tubular member are joined to one another for forming a torsionally resilient connection between the shafts.

If desired, the first tubular member may be radially spaced from the shaft permitting limited angular deflection of the first tubular member with respect to the axis of the shaft, or the second tubular member may be radially spaced from the first tubular member permitting limited angular deflection of the second tubular member with respect to the axis of the first tubular member, or the first tubular member may be radially spaced from the shaft and the second member in turn may be radially spaced from the first tubular member, permitting limited angular deflection of the first tubular member with respect to the axis of the shaft and angular deflection of the second tubular member with respect to the axis of the first tubular member.

Where the first and second tubular members are radially spaced it may be desirable to include a piloting means in the annular space between the members for maintaining the tubular members substantially concentric. In addition, a damping means, such as a liquid or a solid resilient material, may be sealed in the annular space.

The coupling may be rigidly attached at both ends to the driving and driven shafts. However, by being rigidly attached to the shafts, the coupling will only withstand minimal offset and angular misalignment between the driving and driven shafts; therefore, where additional offset and angular misalignment is needed, one or both ends of the coupling may be connected to a torsionally rigid and axially flexible coupling or to a torsionally resilient and angularly flexible coupling.

The above and further objects and novel features of the invention will appear more fully from the following detailed description when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings wherein like parts are marked alike.

DESCRIPTION OF THE PREFERRED EMBODIMENT

Figure 1:
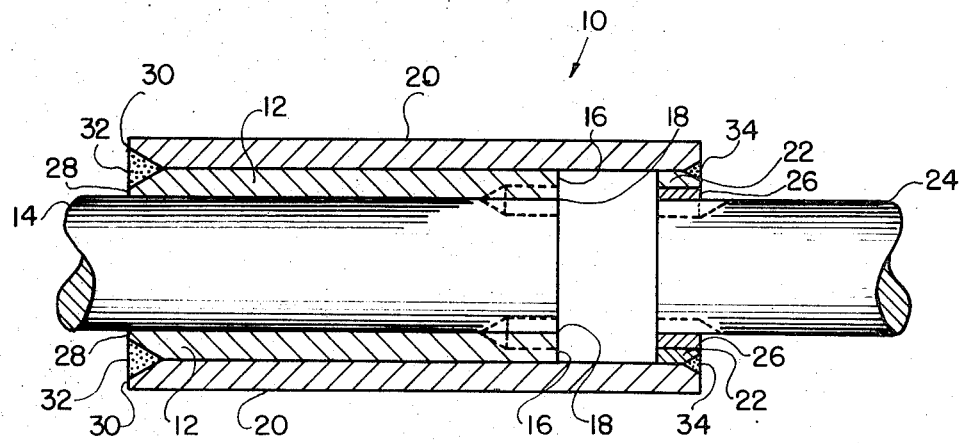
FIG. 1 is a side elevation in cross section showing the primary configuration of the present invention with the tubular members being concentrically and continuously arranged.

The basic or primary torsionally resilient shaft coupling is illustrated in FIG. 1 and generally designated by the numeral 10. Coupling 10 generally comprises an inner or first tubular member 12 which surrounds a portion of one of a pair of coaxially aligned shafts, e.g., shaft 14, and having an end 16 adapted for connection to shaft 14 such as by means of a conventional key 18. An outer or second tubular member 20 surrounds first tubular member 12. Flange 22 on the second member 20 is provided for attaching second member 20 directly to the other coaxially aligned shaft 24 by means of a conventional key 26. The remaining end 28 of first tubular member 12 and the remaining end 30 of second tubular member 20 are connected to one another for forming a torsionally resilient connection between shafts 14 and 24.

Thus, as shown in FIG. 1, torque caused by rotation of shaft 14 is transmitted through a first connection, e.g., key 18, to first tubular member 12; torque from first tubular member 12 is transmitted to second tubular member 20 through a second connection, e.g., a weld 32; torque is then transmitted from second tubular member 20 to flange 22 through a third connection, e.g., a weld 34; and finally torque is transmitted from flange 22 to shaft 24 through a fourth connection, e.g., key 26; thus torque is transmitted from shaft 14 to shaft 24 through these connections; however, since coupling 10 is bi-directional, torque can be similarly transmitted from shaft 24 to shaft 14.

The attachments or connections of first tubular members 12 to second tubular member 20 and second tubular member 20 to flange 22 may be any suitable means well-known in the art, but preferably the tubular members 12 and 20 are connected by welds 32 and 34 as shown in FIG. 1.

Thus it can be seen that one end of coupling 10 can twist or wind up with respect to the opposite end; it is this capability that provides torsional flexibility and enables the coupling to absorb shock loads imparted by the driving shaft thereby reducing the shock imposed on a machine element connected to the driven shaft. For example, if shaft 14 is connected to a roll in a steel rolling mill and shaft 24 is connected to a gear box through which the roll is driven by a motor (not shown), and a strip of steel enters between two of the rolls, a shock load will be imposed on shaft 14 as is well known, especially if the lineal speed of the strip is not the same as the circumferential speed of the rolls. If shaft 14 is connected directly to the gear box, the shock load will be imposed on the gears, possibly causing breakage of the gear teeth. But, with the coupling 10 interposed in the drive train, wind up of the coupling absorbs the shock so that only a fraction of the shock is imparted to the gears.

That is, if torque is applied to shaft 14 while shaft 24 is held stationary, coupling 10 will wind up an amount commensurate to the torque applied and relative to its proportions, and, conversely, will unwind when the torque is relieved.

Figure 2:
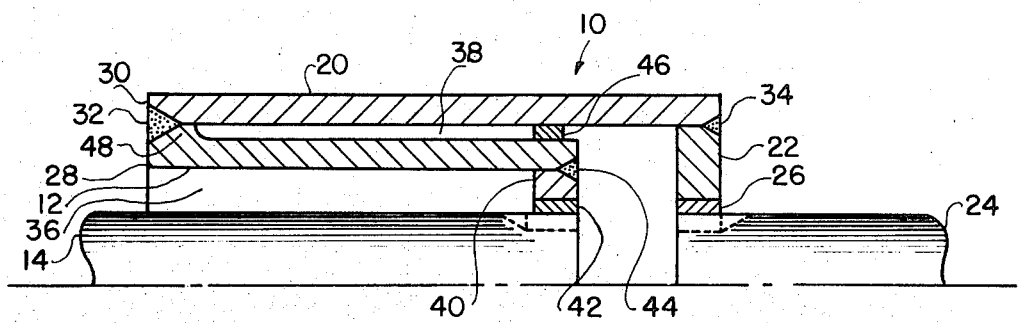
FIG. 2 is a partial side elevation in cross section of a coupling similar to FIG. 1 showing the first tubular member radially spaced from the shaft, the second tubular member radially spaced from the first tubular member, and a piloting means between the spaced first and second tubular members.

To compensate for small inaccuracies in alignment of shafts 14 and 24 coupling 10 may be constructed as shown in FIG. 2. That is, first tubular member 12 has an inner diameter greater than the outer diameter of shaft 14 and the inner diameter of second tubular member 24 is greater than the outer diameter of first tubular member 12, thus permitting angular deflection of first tubular member 12 with respect to the axis of shaft 14 and angular deflection of second tubular member 24 with respect to the axis of first tubular member 12.

Figure 3:
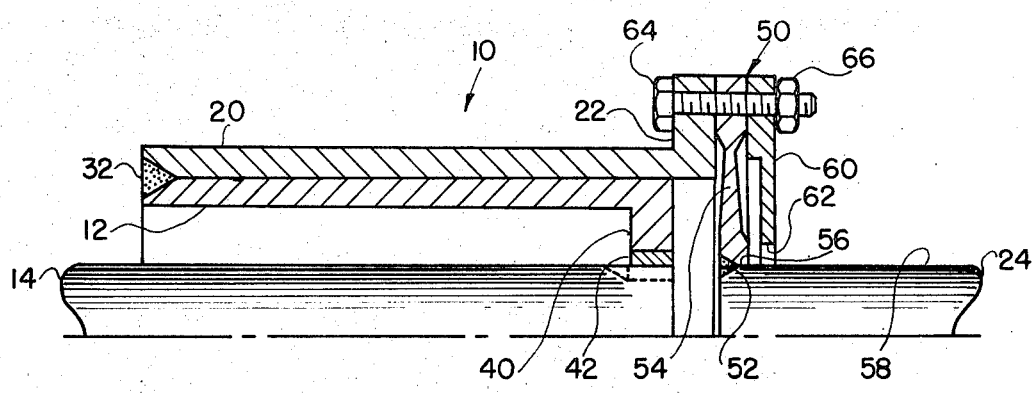
FIG. 3 is a partial side elevation in cross section of the coupling of the present invention showing the first tubular member radially spaced from the shaft and rigidly connected thereto, and the second tubular member connected to a torsionally rigid but axially flexible diaphragm-type coupling which is connected to a second shaft.
Figure 4:
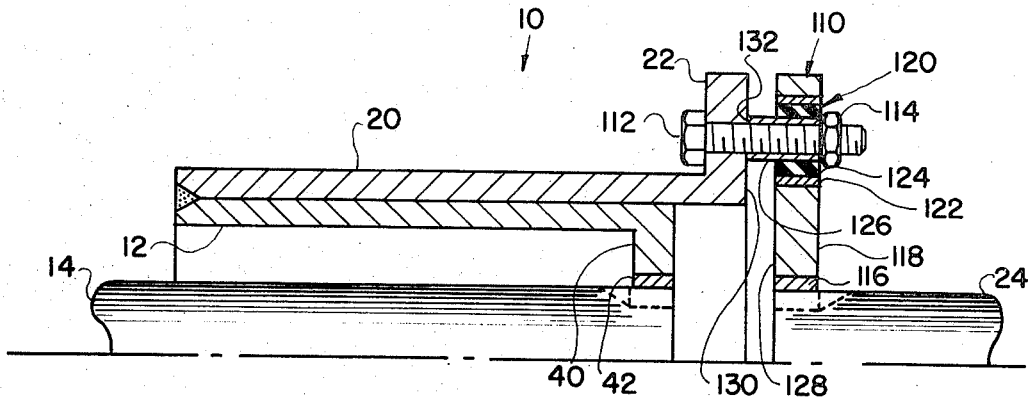
FIG. 4 illustrates the coupling of FIG. 3 with the second tubular member connected to a torsionally resilient and angularly flexible pin and bushing-type coupling.
Figure 5:
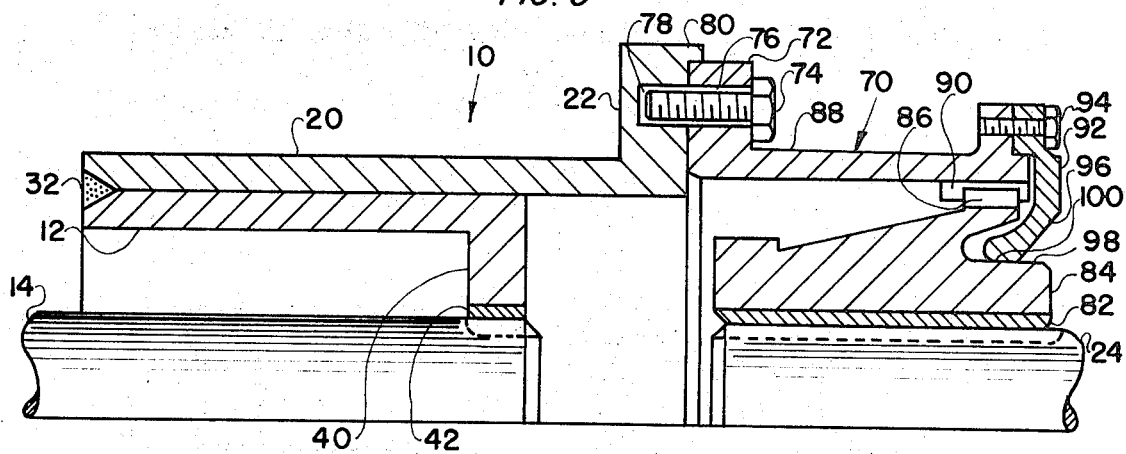
FIG. 5 illustrates the coupling of FIG. 3 with the second tubular member connected to a torsionally rigid but axially flexible gear-type coupling.

To further compensate for greater amounts of misalignment, coupling 10 may be combined with a diaphragm-type coupling as illustrated in FIG. 3, a pin and bushing-type coupling as illustrated in FIG. 4, or a gear-type coupling as illustrated in FIG. 5. These types of connection will be subsequently explained in greater detail.

The amount of twist or wind up capability can be easily calculated to provide the desired torsional flexibility and damping characteristics. Generally, the desired characteristics can be obtained by proportioning the length of the tubular members, the diameter of the members, the wall thickness of the members, and by selecting materials having particular strength and elastic values. Although any one of several materials may be used, steel is usually suitable for most applications.

FIG. 2 illustrates the torsionally flexible coupling of FIG. 1 except that the inner diameter of first tubular member 12 is greater than the outer diameter of shaft 14 and the inner diameter of second tubular member 20 is greater than the outer diameter of first tubular member 12, thereby defining an annular space 36 between shaft 14 and first tubular member 12 and also an annular space 38 between first tubular member 12 and second tubular member 20. In addition, first tubular member 12 is connected to shaft 14 by flange 40 and key 42. Flange 40 is connected to first tubular member 12 by weld 44. Further, coupling 10 may include a piloting means 46 in annular space 38 substantially spaced from the opposite end of first tubular member 12 which includes a radially extending annular bearing surface 48 for connecting first tubular member 12 to second tubular member 20 at connection 32. Thus, connection 32 and piloting means 46 maintain tubular members 12 and 20 in substantially equal radially spaced relationship along the length of tubular members 12 and 20.

A vibration damping means (not shown) may be added to annular space 38 of FIG. 2. The vibration damping means may comprise a highly viscous liquid sealed in annular space 38 between tubular members 12 and 20. Preferably, the liquid completely fills annular space 38 between tubular members 12 and 20 so as to effectively contact the adjacent surfaces of the tubular members.

If desired, the vibration damping means may comprise an annular sleeve of solid resilient material (not shown) in annular space 38. The sleeve of resilient material has a thickness sufficient to assure contact with each of the adjacent tubular members 12 and 20 and will not require a seal (not shown) as would be required using a highly viscous liquid as a vibration damping means.

The basic embodiment shown in FIG. 1 illustrates two overlying concentric metal tubular members 12 and 20. Tubular member 12 is the innermost or first member and therefore has a smaller diameter than outermost or second tubular member 20. The right end of tubular member 12, as viewed in FIG. 1 is secured for rotation directly with shaft 14 by means of conventional key 18. The opposite end 28 of tubular member 12 is attached to one end of tubular member 20 by a weld 32, or by screws (not shown), or the like. Tubular member 20 concentrically overlies tubular member 12 and includes a flange 22 at the end opposite the attachment or connection 32 of tubular member 12 and 20. Flange 22 may be made as a separate piece (as shown) and connected to tubular member 20 by a weld 34 or flange 22 may be made as a continuous part of second tubular member 20 (not shown). Flange 22 may be secured for rotation to shaft 24 by means of conventional key 26.

The overlying concentric tubular members 12 and 20 are connected together as shown. If shaft 14 is the driving shaft, torque will be transmitted through tubular member 12 and then through tubular member 20 in axially alternating directions to driven member 24. Conversely, shaft 24 may be the driving shaft causing torque to first be transmitted through tubular member 20 and then through tubular member 12 in axially alternating directions to driven shaft 14. Therefore, coupling 10 will function equally well regardless of where torque is applied.

The two concentrically arranged tubular members 12 and 20 connected as shown transmit torque in axially alternating directions and thereby provide torsional flexibility between the driving and driven shafts 14 and 24 in substantially less axial length than would be required to accomplish an equivalent amount of torsional flexibility with a single member. Similarly, increased torsional flexibility can be attained by using four, six, or eight members, and so on. The four member configuration provides double the tensional flexibility of the two member configuration, the six member configuration provides three times the torsional flexibility as the two member configuration, and so on. Furthermore, the wall thickness and/or material of each tubular member may be chosen to provide substantially similar torsional wind up in each tubular member.

To compensate for small amounts of shaft misalignment coupling 10 may be constructed as illustrated in FIG. 2. The innermost or first tubular member 12 has an inner diameter that is greater than the outer diameter of shaft 14 causing annular space 36 to be formed between shaft 14 and first tubular member 12. The right end of first tubular member 12 as viewed in FIG. 2, includes flange 40 which is attached or connected to first tubular member 12 by weld 44 or flange 40 may be made as an integral part of first tubular member 12 (not shown) and may be secured for rotation, with shaft 14 by means of conventional key 42. The left end 28 of first tubular member 12 includes a radially extending annular bearing surface 48 and is attached to one end 30 of the outermost or second tubular member 20 by weld 32, or by screws (not shown), or the like. Tubular member 20 has an inner diameter greater than the outer diameter of first tubular member 12 causing annular space 38 to be formed between first tubular member 12 and second tubular member 20. Second tubular member 20 concentrically overlies first tubular member 12 and includes a flange 22 at the end opposite the attachment or connection 32 of tubular members 12 and 20. Flange 22 may be made as a separate piece and connected to second tubular member 20 by weld 34 (as shown) or flange 22 may be made an an integral part of second tubular member 20. Flange 22 may then be secured for rotation to shaft 24 by key 26.

By providing annular space 36 between shaft 14 and first tubular member 12, first tubular member 12 will be able to deflect angularly a small amount with respect to shaft 14 and similarly by providing annular space 38 between first tubular member 12 and second tubular member 20, second tubular member 20 will be able to deflect angularly a small amount with respect to first tubular member 12. By providing tubular members 12 and 20 with the capability of angular deflection, shafts 14 and 24 can have a slight amount of misalignment without being detrimental to the overall system.

The piloting means 46, as shown in FIG. 2, maintains tubular members 12 and 20 in substantially equal radially spaced relationship. Piloting means 46 may be an annular ring 46 which is not made integral with first tubular member 12 but is made as a separate ring member which may be fitted within annular space 38 at a point substantially axially spaced from bearing surface 48 of first tubular member 12 and end 30 of second tubular member 20. Piloting ring 46 is positioned between tubular members 12 and 20 and may be secured to one or the other tubular members such as by welding. In addition first tubular member 12 includes radially extending annular bearing surface 48 for attaching tubular members 12 and 20 to one another. If desired bearing surface 48 may be made as a separate ring and joined to first tubular member 12 such as by welding (not shown). Therefore, tubular member 12 includes bearing surface 48 and piloting ring 46 at the opposite end thereof. Bearing surface 48 and piloting ring 46 are raised at substantially equal distances radially outward beyond the outer circumferential surface of first tubular member 12. Piloting ring 46 and bearing surface 48 maintain annular space 38 between tubular members 12 and 20. Thus piloting ring 46 maintains adjacent concentric tubular members 12 and 20 in radially spaced relationship along the length thereof.

If desired, piloting means 46 may comprise a radially extending annular bearing surface (not shown) which is an integrally formed portion of first tubular member 12. That is, the piloting means is formed as a continuous portion of first tubular member 12 at its end opposite end 28.

Vibration damping means (not shown) may be provided between tubular members 12 an 20 in annular space 38. Annular space 38 may be filled or substantially filled with a torsional vibration damping medium comprising, for instance, a highly viscous silicone liquid, or a solid resilient plastic or rubber-like material such as neoprene which may or may not be bonded to adjacent tubular member surfaces. If desired the thickness of the resilient material may be made greater than annular space 38. The resilient material may be placed over first tubular member 12 then second tubular member 20 is slid over the resilient material thereby deforming the resilient material to provide precompression which enhances damping characteristics. Alternately, the adjacent tubular member surfaces may be individually coated with a plastic nylon-like material so that the individual coatings frictionally engage each other when the tubular members are concentrically arranged and have relative movement under torque loading. If preferred, only one of the two adjacent tubular member surfaces may be coated so as to frictionally engage the other surface.

If a high viscosity liquid, such as one of the silicone types, is used in annular space 38, the liquid shoud substantially fill annular space 38 so as to effectively contact the outer surface of first tubular member 12 and the inner surface of second tubular member 20. The liquid is sealed in annular space 38 by a seal (not shown) which may comprise a resilient annular ring bonded to the tubular member surfaces or other seals may be used, such as piston rings in grooves, the main purpose being to effectively retain the liquid in annular space 38. The damping medium is such that relative torsional movement between the adjacent tubular member surfaces due to torsional wind up or torsional vibration tends to dissipate vibrational energy by shearing the molecules in the liquid.

If a sleeve of solid resilient material is to be used in annular space 38, the sleeve should substantially fill annular space 38 so as to effectively contact the outer surface of first tubular member 12 and the inner surface of second tubular member 20. It is not necessary to seal the sleeve in annular space 38, however, a seal may be provided if it is desired. The sleeve may comprise a rubber or plastic-like material which can, if desired, be poured in a heated liquid state into annular space 38 which will then solidify upon cooling thus adhereing to the outer and inner surfaces of the first and second tubular members, respectively. Damping is accomplished mainly by hysteresis in the sleeve.

If the adjacent tubular member surfaces are individually coated with a plastic or nylon-type material, damping is accomplished mainly by frictional rubbing action wherein the molecules do not shear internally in the material although surface molecules along the engaging coating surfaces do undergo a shearing effect.

Although the preferred embodiment of coupling 10 is illustrated in FIG. 2, it should be understood that coupling 10 may be constructed with alternate arrangements. One such alternate arrangement (not shown) is where a slight amount of shaft misalignment is required but a damping means, as previously described, is not. In this arrangement piloting ring 46 and radially extending annular bearing surface 48 may be eliminated. The inner diameter of second tubular member 20 is made substantially the same as the outer diameter of first tubular member 12 and ends 28 and 30 of first and second tubular members are connected, as shown in FIG. 1, by weld 32. The continous mating surfaces between tubular members 12 and 20 serve the same purpose as piloting means 46 and bearing surface 48 in FIG. 2, e.g., the mating surfaces provide the piloting. This alternate configuration will have limited shaft misalignment capability in that first tubular member 12, being radially spaced from shaft 14, can deflect angularly with respect to shaft 14.

Another alternate arrangement (not shown), of FIG. 2 may be used where a damping means is required but the misalignment factor is minimal. In this arrangement flange 40 is eliminated as a part of first tubular member 12 and first tubular member 12 is connected directly to shaft 14, as shown in FIG. 1, by key 18. Therefore, the inner diameter of first tubular member 12 is substantially the same as the outer diameter of shaft 14. Second tubular member 20 is constructed and attached to first tubular member 12 and shaft 24 as previously described and shown in FIG. 2. A damping means, as previously described, is provided in annular space 38 to provide the damping characteristics. In this configuration, second tubular member 20 has the capability to deflect angularly with respect to first tubular member 12 thereby permitting slight misalignment between shafts 14 and 24.

Where appreciable offset, axial or angular misalignment of shafts 14 and 24 must be accommodated, coupling 10 can be combined with a diaphragm-type coupling, as shown in FIG. 3. In this combination flange 22 is made as a radially outward extension of second tubular member 20 and is attached to a first conventional diaphragm-type coupling member, generally designated as numeral 50. Flange 40 is made as a radially inward extension of first tubular member 12 and is directly attached to shaft 14 by key 42. Although flanges 22 and 40 are shown as an extension of tullar members 12 and 20, it should be understood that they may be separate annular pieces attached to their respective tubular members as shown in FIG. 2. Although FIG. 3 illustrates coupling 10 in combination with a first diaphragm-type coupling member it should be understood that a second diaphragm-type coupling member may be attached to flange 40 to give even greater misalignment capabilities to coupling 10. Diaphragm-type coupling member 50 is secured for rotation with shaft 24 by weld 52, or by any other suitable means. This configuration provides a combination of increased torsional flexibility and the capacity to permit considerable axial and angular misalignment between shafts 14 and 24 while torque is transmitted by the system.

Coupling 10 in FIG. 3 is shown without an annular space 38 since it is not needed if coupling 10 is to be piloted; the continuous mating surfaces between tubular members 12 and 20 serve the same purpose as piloting ring 46 and bearing surface 48 shown in FIG. 2 with respect to piloting. Annular space 38, without piloting ring 46, is used when no piloting is required, but damping and only limited misalignment capabilities is desired, as shown in FIG. 2. Vibration damping characteristics can be obtained by fitting the tubular members 12 and 20 so as to provide frictional rubbing between their contacting surfaces.

However, when piloting is desired along with appreciable misalignment capability, the coupling combination of FIG. 3 is preferred. In this construction coupling 10 provides torsional flexibility and coupling 50 provides misalignment capability between shafts 14 and 24.

Since the construction and function of coupling 10 has been previously described, it will not be described in further detail, and only that portion in relation with diaphragm-type coupling 50 will be described in detail. Coupling 50 includes a radially extending annular torsionally rigid but angularly flexible metal disk 54 which surrounds shaft 24 and is secured thereto. That is, disk 54 has a cut-out radiating from its center so that the radial distance of surface 56 of disk 54 is substantially the same as the radial distance of surface 58 of shaft 24. Disk 54 is placed around shaft 24 and secured thereto such as by weld 52, by a key (not shown), or any other suitable means. A radially extending annular rigid stop means, e.g., a metal disk 60, also surrounds shaft 24 but is not secured thereto. That is, disk 60 has a cut-out radiating from its center so that the radial distance of surface 62 of disk 60 is substantially greater than the radial distance of surface 58 of shaft 24. Both disks 54 and 60 have an overall radial distance substantially equal to the radial distance of flange 22. Flange 22, disk 54, and disk 60 have concentrically aligned bolt holes for receiving bolts 64.

In combining diaphragm-type coupling 50 with coupling 10 and shaft 24, Disk 60 is placed around shaft 24. Disk 54 is then placed around shaft 24 and secured thereto by weld 52. The bolt holes in flange 22, disk 54, and disk 60 are concentrically aligned and bolts 64 are placed through the bolt holes and nuts 66 are threaded on the end of bolts 64 and tightened thereby securing disk 60 and disk 54 to flange 22.

As shaft 24 is rotated torque is transmitted to disk 54 through connection 52. As disk 54 is torsionally rigid, torque will be transmitted to second tubular member 20 through bolts 64. In turn, torque will be transmitted to first tubular member 12 through connection 32 and then to shaft 14 by flange 40 through connection 42. Since disk 54 is axially flexible, it will compensate for angular or axial misalignment between shafts 14 and 24. Disk 60 is provided to prevent damage to disk 54 and to maintain coupling 10 substantially concentric with shafts 14 and 24 in the event disk 54 should fail.

An alternate method of achieving a similar effect as the diaphragm-type coupling of FIG. 3 is to connect the second tubular member 20 of coupling 10 to a gear-type coupling as illustrated in FIG. 5. In this combination a first conventional gear-type coupling member, generally noted as numeral 70, includes a flange 72 and is connected to flange 22 of second tubular member 20 by screws 74. Screw holes 76 are concentrically arranged in flange 72 for alignment with threaded holes 78 in flange 22. Flange 22 preferably includes an annular shoulder 80 mating with flange 72 for centering coupling 10. Screws 74 may be used to secure mating flanges 22 and 72. Gear-type coupling 70 is then secured for rotation with shaft 24 by means of a conventional key 82. This configuration, as does the diaphragm-type coupling in FIG. 3, provides a combination of increased torsional flexibility and the capacity to permit considerable axial, and angular misalignment between shafts 14 and 24 while torque is transmitted by the system. It should be understood that coupling 10 can be combined with a second gear-type coupling (not shown) connected to flange 40 of first tubular member 12 and then connected to shaft 14 for rotation thereby providing additional misalignment capability to the system.

The entire coupling of FIG. 5 is piloted; coupling 10 is piloted as previously described and the gear-type coupling 70 is piloted as follows. Gear coupling 70 includes an inner hub member 84 secured for rotation with shaft 24 by means of a conventional key 82. Inner hub member 84 includes an annular ring of external spur gear teeth 86 around its outer periphery. An outer sleeve member 88 includes an annular ring of internal spur gear teeth 90 around its inner periphery in meshing engagement with the external gear teeth 86. Torque is transmitted through these meshing gear teeth in the customary well-known manner.

Coupling 70 also includes a seal-pilot ring member 92 secured to outer sleeve 88 by screws 94. Ring member 92 includes a flange 96 surrounding a mating shoulder 98 on inner hub 84. Flange 96 and shoulder 98 provide both sealing for retaining lubricant inside the coupling and piloting to maintain outer sleeve 88 concentric with the axis of shaft 24. Flange 96 of ring member 92 includes a rounded surface 100 to permit it and outer sleeve 88 to rock around shoulder 98 when shafts 14 and 24 are misaligned.

As previously described outer sleeve 88 includes annular flange 72 mating with coupling 10 and screws 74 pass through flange 72 and thread into flange 22 of coupling 10 to provide a rigid connection between outer sleeve 88 and coupling 10.

Another alternate arrangement to compensate for appreciable angular misalignment and at the same time provide coupling 10 with additional damping capabilities is to combine coupling 10 with a conventional pin and bushing-type coupling, as shown in FIG. 4. In this combination, flange 22 is attached to a first pin and bushing coupling member, noted generally as numeral 110. As shown in FIG. 4 pin and bushing coupling member 110 is connected to flange 22 by bolts 112. Bolt holes are concentrically arranged in flange 22 for alignment with bolt holes in coupling member 110. Nuts 114 are threaded on bolts 112 and tightened thereby connecting coupling member 110 to coupling 10. Coupling member 110 is secured for rotation with shaft 24 by means of conventional key 116. This configuration provides a combination of increased torsional flexibility, damping action between shafts 14 and 24, and angular misalignment capabilities between shafts 14 and 24 while torque is transmitted by the system. It should be understood that coupling 10 can be combined with a second pin and bushing-type coupling (not shown) connected to flange 40 of first tubular member 12 and then connected to shaft 14 for rotation thereby providing additional misalignment capability to the system.

Coupling 110 includes a radially extending rigid annular ring 118 whose center has been cut out so that annular ring 118 can be placed around shaft 24. Annular ring 118 is secured to shaft 24 by means of conventional key 116. Located around the circumference of annular ring 118 is a plurality of holes placed in such a manner that are concentrically aligned with the holes in flange 22. The diameter of each hole in annular ring 118 is made substantially larger than the holes in flange 22 in order to accommodate, along with bolts 112, the angular deflecting and damping mechanism, noted generally as numeral 120, of coupling 110.

Angular deflecting and damping mechanism 120 includes rigid metal annular rings or bushings 122. The outside radial dimension of bushings 122 is substantially the same as the radial dimension of each hole in annular ring 118. Bushings 122 are placed in each hole and secured in place such as by a press fit. Annular resilient bushings 124 made of solid resilient material whose outside radial dimension is substantially the same as the inside radial dimension of bushings 122 are placed inside bushings 122 located in the holes of annular ring 118. Resilient bushings 124 may comprise a rubber or plastic-like material and may be secured to bushings 122 such as by bonding (not shown). Annular rigid metal sleeves 126 whose outside radial dimension is substantially the same as the inside radial dimension of resilient bushings 124 and whose inside radial dimension is substantially the same as the outside radial dimension of bolts 112 are placed within resilient bushings 124 and may be secured thereto such as by bonding (not shown).

In order for shaft 24, and consequently coupling 110, to deflect angularly due to misalignment between shafts 14 and 24, surface 128 of annular ring 118 and surface 130 of flange 22 must be axially spaced to provide a space for coupling 110 to angularly oscillate without surfaces 128 and 130 contacting each other. To maintain the space between surfaces 128 and 130, sleeve 126 is axially extended beyond surface 128 of annular ring 118 a sufficient amount to radially space surfaces 128 and 130. To maintain the spacing, ends 132 of sleeves 126 abut surface 130 of flange 22. Bolts 112 are placed through the holes in flange 22 and through sleeves 126. Nuts 114 are threaded on bolts 112 and tightened against sleeves 126 thereby maintaining sleeves 126 in abutting contact with surface 130 of flange 22.

As illustrated in FIG. 4, when shaft 24 is rotated torque is transmitted to annular ring 118 through keyed connection 116. Torque is then transmitted from annular ring 118 to bushings 122 where the torque is transmitted to resilient bushings 124. Because of the resilient nature of resilient bushings 124 a certain amount of shock and vibrational forces will be damped, that is, absorbed and dissipated before the torque is transmitted to sleeves 126. That is, when torque is applied to resilient bushings 124, bushings 124 will flex and deform prior to torque being transmitted to sleeves 126. Torque is then transmitted from sleeves 126 to bolts 112. Torqus is then transmitted through bolts 112 to flange 22, through flange 22 to second tubular member 20, through second tubular member 20 to first tubular member 12 by connection 32, through first tubular member 12 to flange 40, and through flange 40 to shaft 14 by keyed connection 42.

Also, because of the flexibility of resilient bushings 124, shaft 24, annular ring 118, and bushing 122 will be able to deflect angularly about sleeves 126 and bolts 112 when the system is rotating thereby allowing angular misalignment between shafts 14 and 24.

Figure 6:
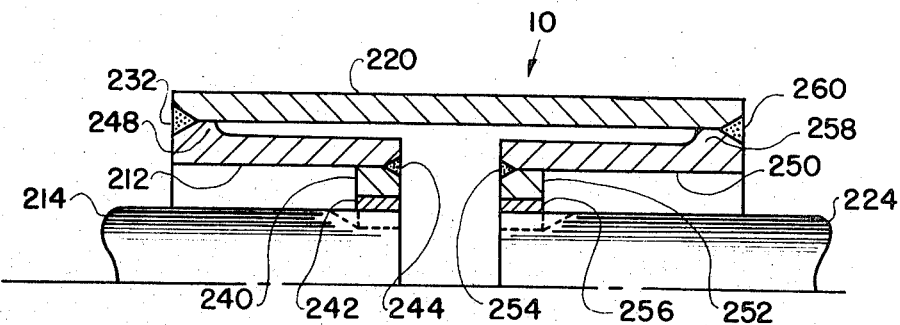
FIG. 6 is a partial side elevation in cross section showing a first tubular member radially spaced from one shaft, a second tubular member radially spaced from the other shaft and in coaxial alignment with the first tubular member and a third tubular member radially spaced and surrounding the first and second tubular members.

FIG. 6 illustrates an alternate arrangement to coupling 10, as shown in FIG. 2. In this arrangement torsionally resilient coupling 10 includes a first tubular member 212 surrounding an end portion of shaft 214. Tubular member 212 is radially spaced from shaft 214; that is, the inner radial dimension of first tubular member 212 is substantially greater than the outer radial dimension of shaft 214. The right end of first tubular member 212 as viewed in FIG. 6, includes a separate flange 240 which is attached to first tubular member 212 by weld 244. Flange 240 can then be directly attached to shaft 214 by means of conventional key 242. The left end of first tubular member 212 includes a radially extending annular bearing surface 248. A second tubular member 250 surrounds an end portion of shaft 224. Second tubular member 250 is axially aligned with and constructed similar to first tubular member 212; that is, second tubular member 250 includes a flange 252 connected to second tubular member 250 by weld 254, flange 252 in turn is directly connected to shaft 224 by means of conventional key 256, and second tubular member 250 has a radially extending annular bearing surface 258 on its right end as viewed in FIG. 6. A third tubular member 220 surrounds both first and second tubular members 212 and 250 respectively and is attached at one end to first tubular member's bearing surface 248 by weld 232 and attached at the other end to second tubular member's bearing surface 258 by weld 260. Thus, when shaft 214 is rotated torque is transmitted from shaft 241 to flange 240 by keyed connection 242, to first tubular member 212 by connection 244, to third tubular member 220 by connection 232, to second tubular member 250 by connection 260, to flange 252 by connection 254, and to shaft 224 by keyed connection 256. It should be understood that torque may be transmitted equally well from shaft 224 to shaft 214.

If desired, coupling 10 of FIG. 6 may also include a piloting means between first tubular member 212 and third tubular member 220 and between second tubular member 250 and third tubular 220 similar to that which was previously described in FIG. 2. Also, if desired, a damping means may be included between tubular members 212, 250, and 220 as previously described in FIG. 2.

Although coupling 10 as shown in FIG. 6, is preferred for this configuration, it should be understood that coupling 10 may be constructed with alternate arrangements similar to those previously described in FIGS. 1 through 5.

Thus, the coupling, with various combinations of overlying concentric tubular members transmits torque from a drive member through each succeeding tubular member of the coupling in axially alternating directions and subsequently to a driven member. Various vibration damping materials may be used between adjacent tubular members. The basic coupling without piloting means can accommodate limited offset and angular misalignment between the axes of the drive and driven shafts, or, can be joined with a diaphragm-type coupling, gear-type coupling, or pin and bushing-type coupling or other types where appreciable misalignment must be accommodated.

Having thus described the invention in its best embodiment and mode of operation, that which is desired to be claimed by Letters Patent is:

1. A coupling for connecting a pair of coaxially aligned shafts for torsionally resilient driving rotation, comprising:
   a first tubular member surrounding a portion of at least one of said shafts and having an end adapted for connection thereto;
   a second tubular member surrounding said first tubular member and having an end adapted for connection to the other of said shafts,
   said second tubular member having an inner diameter larger than the outer diameter of said first tubular member;
   the remaining end of said first tubular member including a radially extending annular bearing surface connected to the remaining end of said second tubular member for connecting said tubular members and for defining an annular space between said first and second tubular members; and
   a rigid annular pilot ring within said annular space and axially spaced from said bearing surface on said first tubular member and said remaining end of said second tubular member for maintaining said first and second tubular members substantially concentric.

2. The coupling of claim 1 wherein the inner diameter of said first tubular member is larger than the outer diameter of said shafts for permitting angular deflection of said first tubular member with respect to the axis of said shaft.

3. The coupling of claim 1 wherein said remaining end of said second tubular member and said bearing surface of said first tubular member are joined to one another by a weld means for transmitting torque between said first tubular member and said second tubular member.

4. The coupling of claim 1 wherein said annular space defined by said axially spaced bearing surface and said rigid pilot ring between said tubular members includes a damping means for damping vibration and shock transmitted from one of said shafts to the other of said shafts.

5. The coupling of claim 4 wherein said damping means comprises a liquid sealed within said annular space by said bearing surface and said rigid annular pilot ring and which substantially fills all of said annular space thereby insuring that said liquid contacts said first and second tubular members for damping vibration and shock between said shafts.

6. The coupling of claim 4 wherein said damping means comprises an annular sleeve of solid resilient material which substantially fills all of said annular space.

7. The coupling of claim 1 wherein said ends of said first and second tubular members are adapted for rigid connection to respective ones of said shafts for transmitting torsional rotation from one of said shafts to the other of said shafts. shafts.

8. The coupling of claim 1 wherein said end of at least one of said tubular members is secured to a torsionally rigid and axially flexible coupling means adapted for connection to at least one of said shafts to compensate for angular and axial misalignment between said 9. The coupling shafts of claim 8 wherein said torsionally rigid and axially flexible coupling means comprises a gear-type coupling.

10. The coupling of claim 8 wherein said torsionally rigid and axially flexible coupling means comprises a diaphragm-type coupling.

11. The coupling of claim 1 wherein said end of at least one of said tubular members is secured to a torsionally resilient an angularly flexible coupling means adapted for connection to at least one of said shafts to provide damping between said shafts and to compensate for angular misalignment therebetween.

12. The coupling of claim 11 wherein said torsionally resilient and angularly flexible coupling means comprises a pin and bushing-type coupling.

* * * * *